United States Patent [19]

Byers et al.

[11] Patent Number: 5,017,855
[45] Date of Patent: May 21, 1991

[54] CURRENT CONTROLLED INVERTER

[75] Inventors: David J. Byers, Ilam; John R. Penny, Tawa, both of New Zealand

[73] Assignee: GEC (New Zealand) Limited, New Zealand

[21] Appl. No.: 164,232

[22] Filed: Mar. 4, 1988

[51] Int. Cl.$^5$ .............................................. H02P 5/40
[52] U.S. Cl. ..................................... 318/811; 318/803
[58] Field of Search ............... 318/811, 803, 807-810; 363/42, 43

[56] References Cited

U.S. PATENT DOCUMENTS

| | | | |
|---|---|---|---|
| 3,619,749 | 11/1971 | Schieman | 318/298 |
| 3,636,430 | 1/1972 | Kernick et al. | 363/41 |
| 3,648,150 | 3/1972 | Kernick et al. | 363/41 |
| 3,896,348 | 7/1975 | Loderer | 318/798 |
| 4,249,120 | 2/1981 | Earle | 318/729 |
| 4,361,792 | 11/1982 | Davis, Jr. et al. | 318/729 |
| 4,467,262 | 8/1984 | Curtiss | 318/811 |
| 4,546,422 | 10/1985 | Okado | 318/811 |
| 4,558,269 | 12/1985 | Ishida et al. | 318/811 |
| 4,656,401 | 4/1987 | Ninomiya et al. | 318/806 |

FOREIGN PATENT DOCUMENTS 629618  8/1978  U.S.S.R. ............... 318/729

OTHER PUBLICATIONS

Palaniappan et al, "A Control Strategy for Reference Wave Adaptive Current Generation", IEEE Transactions on Industrial Electronics and Control Instrumentation, vol. IEC1-27, No. 2, May 1980, pp. 92–96.

Primary Examiner—David Smith, Jr.
Attorney, Agent, or Firm—Merchant, Gould, Smith, Edell, Welter & Schmidt

[57] ABSTRACT

An AC motor drive using current control instead of the more usual voltage control. The instantaneous inverter phase currents are monitored by sensors 16, 17, 18 and used as feedback to enable the inverter phases to be switched so that each phase current conforms in frequency and amplitude to a phase reference sinusoid produced by a sine wave generator 6. The reference sinusoids are isolated from the feedback comparators 7, 8, 9 with the phase current sensors and comparators having a common reference potential to overcome problems inherent in isolating the sensors.

Motor fluxing is optimised at all working frequencies and motor loading by controlling the magnitude of each phase current I, such that $$I = I_q \times f(\phi)/\sin\phi$$

where $I_q$ is the motor magnetising current, $\phi$ is the phase angle between the motor phase voltage and current, and $f(\phi)$ is a function of $\phi$ which varies between a minimum value and 1. Means for continuously measuring $\phi$ and performing the required calculation are disclosed.

6 Claims, 6 Drawing Sheets

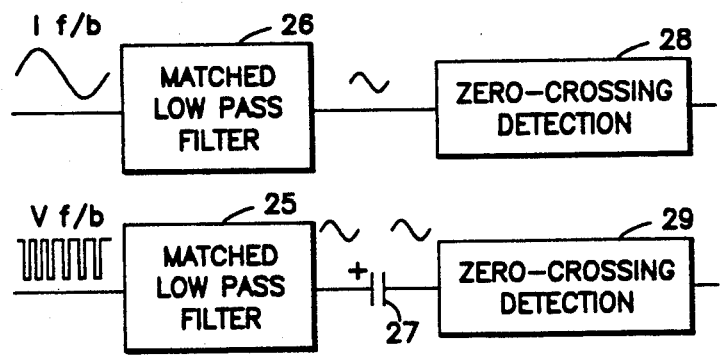
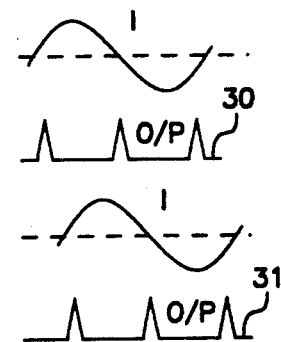
FIG. 7A                FIG. 7B
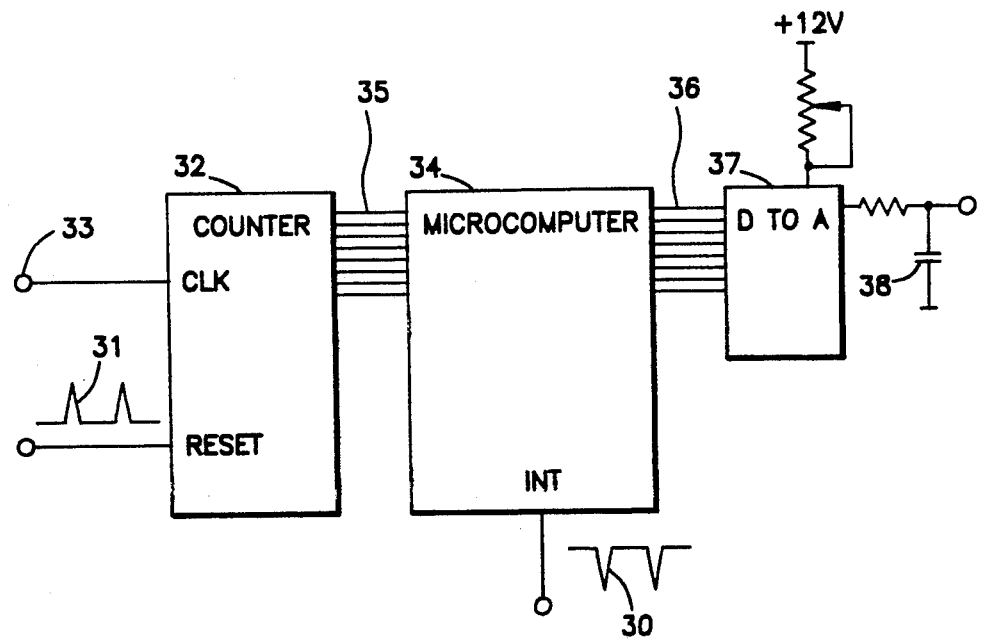
FIG. 8

CURRENT CONTROLLED INVERTER

FIELD OF THE INVENTION

This invention relates to AC motor speed controllers and in particular, but not solely to controlled-current inverters.

DESCRIPTION OF THE PRIOR ART

Squirrel-cage induction motors are robust, light-weight, compact easily maintained and economical to run. They are available in enclosure types to suit a wide range of operating environments, the most common type being the totally enclosed, fan cooled (TEFC) motors, which are suitable for operation in extremely hazardous operating environments where other motor types could not be employed. Consequently, induction motors are used in a wide variety of industrial applications and are the most common type of motor found in industry today.

The limitation of the induction motor has been that its synchronous speed is fixed by the AC supply frequency. Modern semiconductor-based AC motor speed controllers provide the ability to vary the supply frequency to the motor and hence effectively control the motor speed.

Nearly all solid state variable frequency motor speed controllers have two stages of power conversion. The first stage is rectification of the AC supply to develop a constant voltage DC bus. This DC supply is then 'inverted' using high power semiconductor switches to form the variable frequency supply for the motor. The inverter fundamental output frequency is determined by controlling the transistor switching strategy. The semiconductor power switches can be switched to control either voltage applied to the motor or the current delivered from the inverter. The distinction separates solid state AC motor speed controllers into two classes, controlled-voltage inverters and controlled-current inverters.

It is important that essentially constant rated magnetic conditions are maintained in the motor as the supply frequency is varied, so that the motor may respond quickly to highly impulsive loads. This has led to the voltage control strategy common to all pulse width modulated (PWM), controlled-voltage inverters, that the inverter fundamental output voltage is varied with fundamental frequency to maintain rated air-gap flux in the motor. Controlled-voltage inverters produce three phase PWM voltage waveforms with an approximately average sinusoidal value and rely on the motor inductance to act as an integrating filter and provide approximately sinusoidal motor current waveforms with, hopefully low harmonic content.

Controlled-voltage inverters only exhibit indirect control of the motor input current by ensuring the motor input voltage is correct for the motor operating conditions. This leaves the motor input current susceptible to instability made evident by low frequency oscillations in the peak amplitude of the current waveforms, despite constant motor loading. An alternative to the PWM controlled-voltage inverters are controlled-current inverters. SCR based controlled-current inverters have been available for many years and their features are well documented. They allow low SCR switching rates to be employed but produce poor quality square wave output current waveforms resulting in very inefficient motor speed control when compared with modern PWM controlled-voltage inverters. The advent of modern fast power switches has allowed the development of controlled-current inverters producing, high quality, near sinusoidal, inverter output current waveforms, providing efficient, quiet, induction motor speed control with no incipient current waveform instability.

Such controlled-current inverters use feedback, derived from monitoring the instantaneous inverter phase currents, to enable the inverter phases to be switched so that each inverter phase current conforms to a reference phase sinusoid in both frequency and amplitude. In the past the comparison of the reference and inverter current waveforms has been carried out referred to the inverter electronics "ground" potential (normally chassis earth). This means that any transducer used to obtain a representation of the current flowing at the inverter phase output must provide very good high voltage switching isolation, while maintaining the ability to sense both AC and DC current levels with absolutely no drift in characteristics or frequency/phase problems.

This requirement immediately rules out resistive shunts, which cannot provide the high voltage switching isolation, and ordinary current transformers, which cannot transform DC. In the past transducers incorporating Hall Effect sensors, current mirroring operational amplifiers and DC current transformers have been investigated, but none proved to be totally satisfactory. Drift problems nullified any advantages in using Hall Effect sensors, while the common mode rejection ratio of the operational amplifiers was insufficient to obtain the required high voltage switching isolation. The complex and therefore expensive DC current transformers suffer from limited bandwidth problems.

As with controlled-voltage inverters it is essential to maintain correct motor fluxing at all working speeds. Hitherto this has not been easily attained in current-controlled inverters.

SUMMARY OF THE INVENTION

It is an object of the present invention to provide a controlled-current inverter which overcomes the above problems.

Accordingly in one aspect the invention consists in an AC motor speed controller comprising:

a polyphase switching inverter the output phases of which supply power to the controlled motor and the switching of which is determined by a polyphase input signal, a polyphase sinewave generator of variable frequency and amplitude which supplies phase reference waveforms for the inverter, said frequency determining the speed of the controlled motor and in respect of each phase, a low value resistor in series with the inverter output and motor across which a voltage waveform linearly proportional to the output current waveform is developed, isolating means having an input port and an output port with the input port being connected to said generator to receive a reference waveform, comparator means having one input connected to one terminal of the output port of said isolating means and a second input connected to the motor side of said resistor, the second terminal of the output port of the isolating means being connected to the inverter side of said resistor which provides a common reference potential for the comparator inputs, and said comparator output forming one phase of said inverter polyphase input signal.

In a further aspect the invention consists in an AC motor speed controller comprising:

a polyphase switching inverter the output phases of which supply power to the controlled motor and the switching of which is determined by a polyphase input signal, a polyphase sinewave generator of variable frequency and amplitude which supplies phase reference waveforms for the inverter, said fequency determining the speed of the controlled motor, and said fequency and amplitude determined by respective control signals, inverter output phase current sensing means which generate waveforms substantially linearly proportional to the phase current waveforms, comparator means which compare the waveforms from the current sensing means with said reference waveforms and supply error signals as the inverter polyphase input signal to provide current feedback, means which sense the inverter output phase current and voltage and derive the phase difference between them, a microcomputer loaded with the value of the magnetising current appropriate to the controlled motor and a function of the phase difference and continually on-line loaded with a digital value representing said phase difference which continually calculates a quotient equal to the magnetising current divided by the sine of the phase difference the product of said quotient and the function of the phase angle and outputs said product as the control signal for the sinewave generator amplitude.

In yet a further aspect the invention consists in an AC motor speed controller comprising:

a polyphase switching inverter the output phases of which supply power to the controlled motor and the switching of which is determined by a polyphase input signal, a polyphase sinewave generator of variable frequency and amplitude which supplies phase reference waveforms for the inverter, said frequency determining the speed of the controlled motor, and said frequency and amplitude determined by respective control signals, inverter output phase current sensing means, comparator means which compare the waveforms from the current sensing means with said reference waveforms and output error signals, delay means including bilateral delay circuits connected to the outputs of the comparator means which delay the comparator signals by a predetermined period to limit the inverter switching frequency and output a single switching signal for each phase, said switching signals forming the inverter polyphase input signal.

BRIEF DESCRIPTION OF THE DRAWINGS

The preferred forms of the invention will now be described with reference to the accompanying drawings in which:

FIG. 7a shows a block diagram of part of the current amplitude control system, FIG. 7b shows waveforms in the current amplitude control system, FIG. 8 shows a further portion of the current amplitude control system including a microcomputer.

DESCRIPTION OF THE PREFERRED EMBODIMENTS

The present controlled-current inverter uses feedback, derived from monitoring the instantaneous inverter phase currents, to enable the inverter phases to be switched so that each inverter phase current conforms to a reference phase sinusoid in both frequency and amplitude. As all power switching devices have practical limits to their maximum switching rates, some method has to be implemented to control the rate of power device switching. In the present inverter a time delay system applied to the feedback comparator is used to limit the inverter switching rate.

Figure 1A:
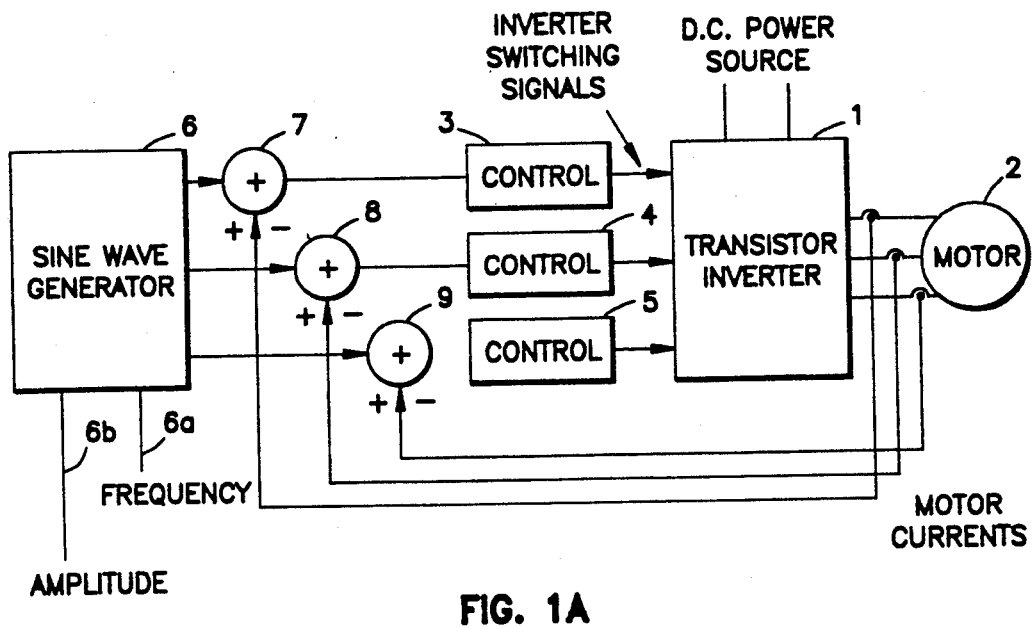
FIG. 1a is a block diagram of an AC motor speed controller employing a current-controlled inverter.

Referring to FIG. 1a a three-phase transistor inverter supplies three phase current to a squirrel cage motor 2. Controllers 3 to 5 each independently control the switching of the inverter for a respective output phase current. The controllers are supplied with a three-phase sinusoidal input signal from sinewave generator 6. The output current waveforms are fed back and compared with the sinusoidal reference waveforms in comparators 7 to 9. The sinewave generator output frequency and amplitude are determined by D.C. inputs 6a and 6b. Input 6a of course determines the motor speed and input 6b is derived, as described later, to ensure current amplitude from the inverter correctly fluxes the motor to a given speed.

Figure 1B:
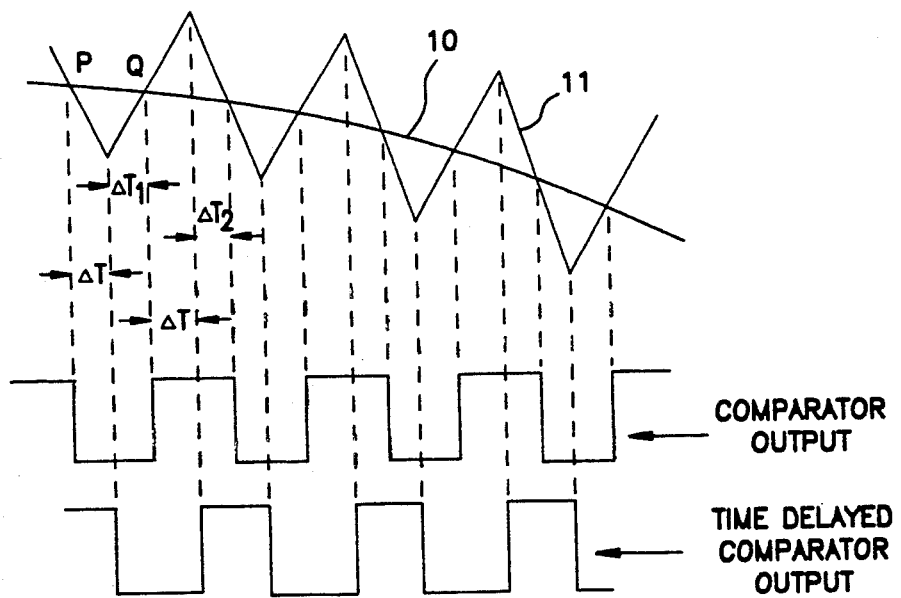
FIG. 1b is a waveform diagram illustrating the current feedback action of the inverter and the method of limiting the switching frequency of the power switches.

Referring to FIG. 1b output transistor switching, for each phase, is determined through the comparison of a reference sinusoidal phase waveform 10 with the actual inverter current waveform 11. A bi-lateral time delay, applied to the comparator output by delay means 40 sets the limit to the inverter switching rate. Thus, when waveform 11 crosses reference waveform 10, either negative-going (point P) or positive-going (point Q), the comparator output switching is delayed by a pre-set time $\Delta T$. This is in contrast to an amplitude hysteresis type of system which relies on the motor time constant and consequentially varies with motor loading. $\Delta T_1$ and $\Delta T_2$ are the time delays after switching before reference-crossing and $\Delta T_1 + \Delta T_2$ is approximately equal to $2 \Delta T$. Thus the inverter has an approximate average switching rate given by $$\frac{1}{4\Delta T}$$

Figure 2:
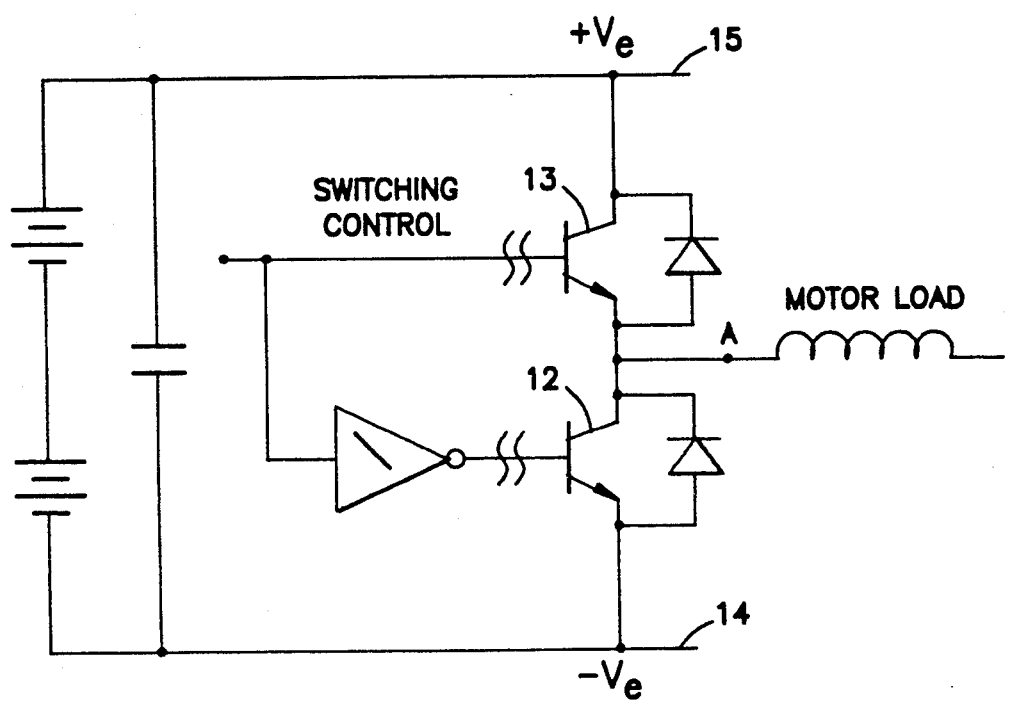
FIG. 2 is a schematic of the output stage of one phase of the inverter.

One phase of the controlled-current transistor inverter output stage is shown in FIG. 2. The output transistor switching is complementary. The inverter output, point A, will switch between the inverter D.C. bus rails 14 and 15, dependent on whether transistor 12 or transistor 13 is switched on. This creates severe isolation problems if the phase output current is to be sensed at point A.

Figure 3:
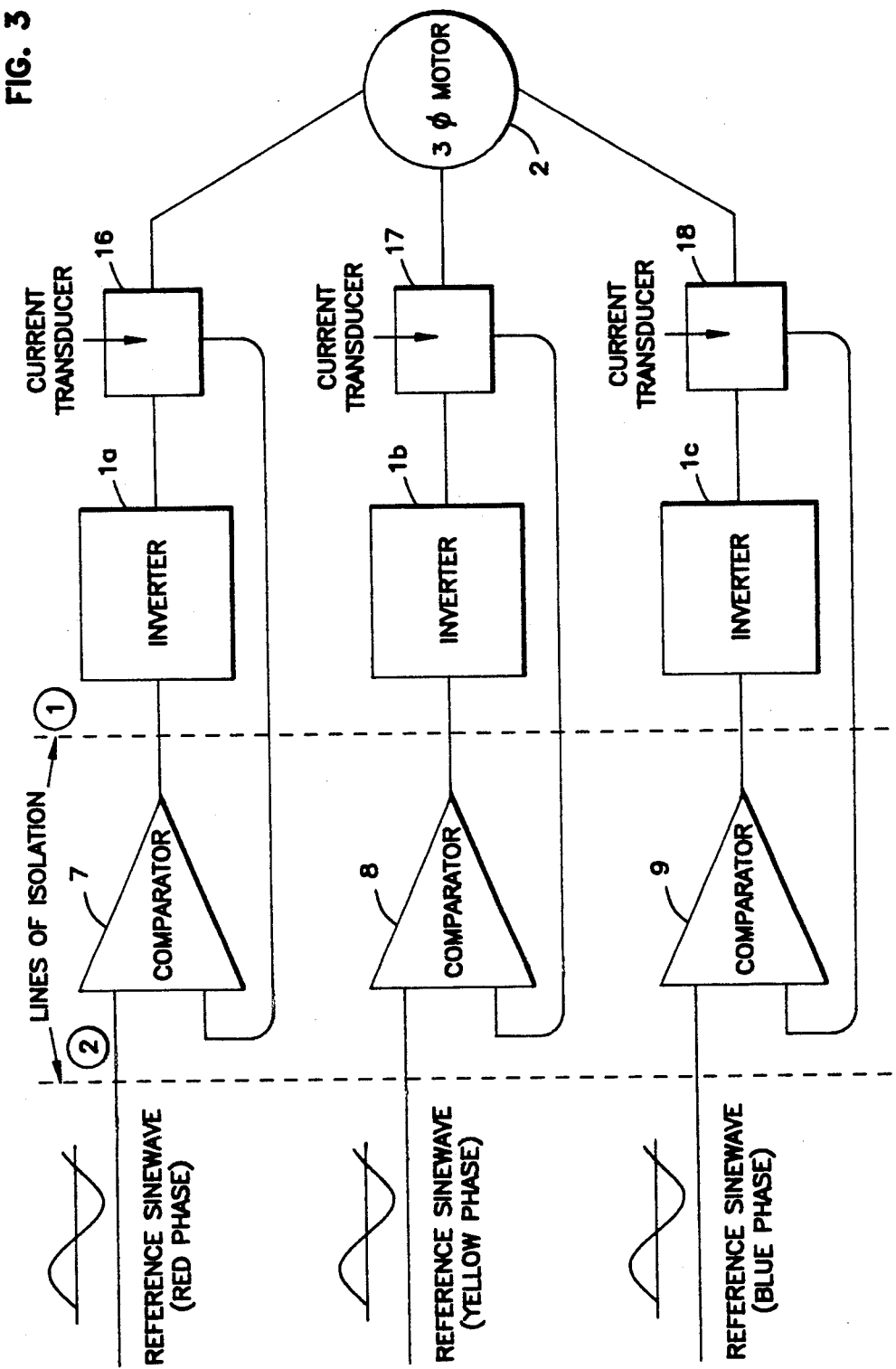
FIG. 3 is a block diagram of the inverter highlighting isolation techniques required to facilitate current feedback.

FIG. 3 shows a redrawing of part of FIG. 1(a) and shows a three phase controlled-current inverter with two possible lines of isolation marked on it. Line 1 represents the traditional region of isolation where the comparison (by comparators 7 to 9) is carried out referred to electronics earth potential, with isolation between electronics, the transducers 16 to 18 and the inverter transistor base drives. Isolation of the comparator output is no problem since the comparator outputs are simply digital signals and may easily be transferred at whatever rate the comparator switches. However, transducer isolation, as previously discussed, causes problems. Line 2 represents the region of isolation used in the present invention, where the isolated comparators 7 to 9 are tied to the same reference potential as the current transducers 16 to 18, (point A of FIG. 2). This has the advantage of permitting a simple shunt resistor to be used as the current transducer.

At first sight this approach presents problems of how to get the reference sinewaves from generator 6 into the isolated comparator circuitry. A simple, small, iron-cored signal transformer 22 is adequate for the task (see FIG. 4 where a single phase is shown), easily achieving a perfectly flat transfer characteristic over the frequency range required ($2 < f < 100$ Hz).

Figure 4:
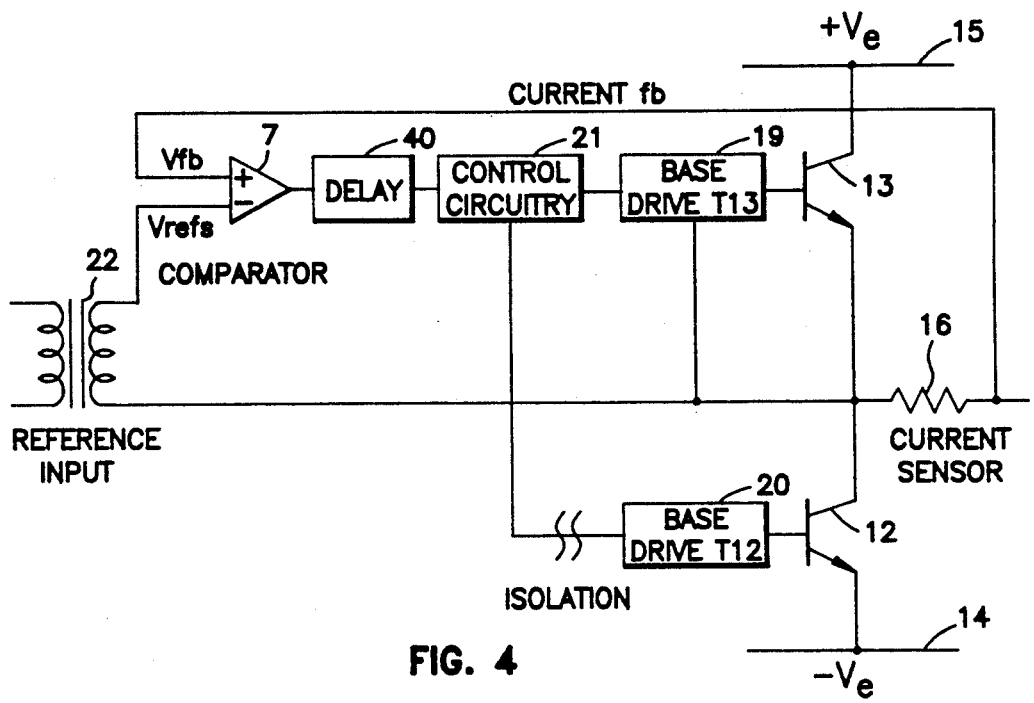
FIG. 4 is a diagram showing one phase of the inverter showing the isolation technique used in the present invention.

In FIG. 2 it can be seen that point A is at the emitter potential of the top transistor 13. This emitter has an isolated positive and a negative power supply centered about it as part of its isolated base drive. For this reason the comparison and associated control circuitry is incorporated into the existing isolated electronics power supply of the inverter transistor base drive 19 (FIG. 4). Control over the base drive circuitry of transistor 13 is accomplished by direct connection. However control over the bottom transistor 12 can only be accomplished through use of some type of digital isolating technique since the base drive circuit 20 must necessarily be isolated from the base drive circuit 19. Isolation is achieved by the use of a pulse transformer or an opto-isolator.

The reference input signal voltage $V_{refs}$ at the secondary of the signal transformer 22 is symmetrical about point A, as one side of the secondary winding is tied to A. This is also the case for the current feedback signal voltage $V_{fb}$ (waveform 11 of FIG. 1(b)) as one side of the current sense resistor 16 is also tied to A. Thus, point A provides the comparator and control circuitry "ground" or zero-signal reference potential.

In the normal controlled-voltage mode of operation for a three phase induction motor, the current drawn depends on motor loading. In a controlled-current system, the inverter must vary the output current amplitude depending on the motor loading. As the inverter output frequency is varied and the load varies, the motor fluxing should be controlled for optimal motor performance. At its simplest level this control will ensure fluxing is maintained at the design value for the motor. This means that the magnetising current would remain constant irrespective of motor speed or loading.

Figure 5:
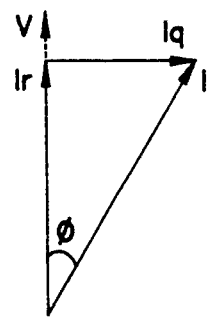
FIG. 5 is a vector diagram of current and voltage relationships in the controlled motor.

By examining the motor equivalent circuit, actual motor parameters can be related to a vectorial representation of motor currents as shown in FIG. 5. Taking one phase only, I represents the motor phase input current, $I_r$ represents the active component of I (in phase with the motor phase input voltage) and $I_q$ represents the reactive component of I (lagging the motor phase input voltage by 90 degrees). If the leakage reactances are ignored, then it can be assumed that the reactive (or quadrature) component of the motor current represents the magnetising current.

Thus the second aspect of the present invention involves keeping the quadrature current at an appropriate magnetising current value for all motor running conditions to correctly flux the motor. In the simplest form the inverter output current magnitude is controlled to keep the quadrature component of the motor input current at the design (constant) value. From FIG. 5 it can be seen that $$I_q = I \cdot \sin \phi$$

where $\phi$ is the phase angle between the motor phase voltage and the motor phase current. Rearranging this equation gives $$I = \frac{I_q}{\sin \phi}$$

As the design value of magnetising current for the motor $I_q$ is known and the phase angle between the voltage and current can be measured then the inverter output current I can be calculated.

The present invention solves the two problems of (a) how to measure $\phi$ accurately and rapidly over a wide range of frequency and loading conditions, and (b) how to accurately implement $I = I_q/\sin \phi$ to produce a continuous analogue output which represents the required magnitude of I.

Figure 6:
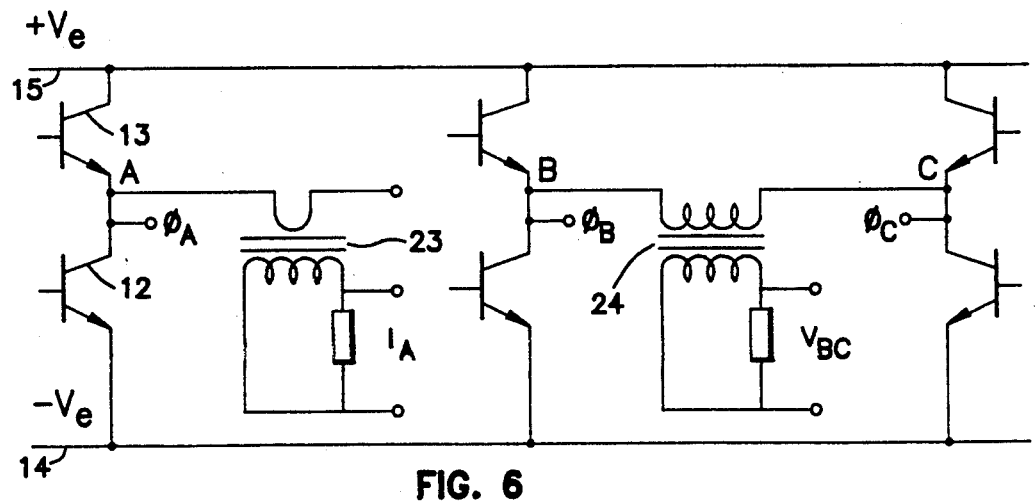
FIG. 6 is a diagram showing inverter output current and voltage sensing for one phase of the output current amplitude control system.

In order to calculate the effective phase angle $\phi$, the inverter output voltage and current waveforms are required. The current waveform is obtained by using a current transformer 23 at the inverter output A as shown in FIG. 6. The inverter output voltage is a high frequency, asynchronously switched waveform, with a fundamental component at the same frequency as the current output. A simple voltage transformer 24 is used to provide the required line voltage feedback information. It is connected between the outputs B and C, which are the other inverter output phases for a three phase inverter. A low pass filter 25 (see FIG. 7a) is used to produce the final representation of the fundamental output voltage waveform.

Phase shift problems are overcome by filtering the current waveform from transformer 23 with an identical filter 26 so that it has the same phase shift as the voltage. The waveforms conditioned in this way are then zero-crossing detected by detectors 28 and 29 to produce pulse waveforms 30 and 31 shown in FIG. 7(b).

The time difference between the zero-crossing of the voltage V and the zero-crossing of the current I is proportional to the phase angle $\phi$ for a fixed frequency. As the frequency is varied, the time differences between corresponding pulses in waveforms 30 and 31 will vary proportionally with frequency.

In the present invention a digital counter 32 (see FIG. 8) is reset on a voltage zero-crossing and then proceeds to count pulses in a signal 33 having a frequency proportional to the inverter output frequency. The count it has reached when the current zero-crossing pulse 30 occurs is proportional to $\phi$, independent of inverter output frequency. The current zero-crossing is used to interrupt a microcomputer 34 which then proceeds to read in the counter value through a parallel interface 35 and calculate the required inverter output current following the equation $$I = I_q/\sin \phi$$

The digital output 36 is converted to an analogue signal by D-A converter 37.

This is then filtered by low pass filter 38 to reduce the undesirable effects or discrete jumps in the demanded output current and the signal produced constitutes D.C. control input 6b which determines the amplitude of the sinewave generator signal (see FIG. 1(a)).

If the output current at phase A is sensed, the line voltage between the other two phases, B-C, will lead the A phase current vector by $\phi+90$ degrees. As voltage and current zero crossings occur twice per cycle, a phase sequency change, caused through reversing the motor, will exchange B and C phases but the zero-crossing points for the B-C line voltages will remain the same. The count of counter 32, used to record the phase angle, returns to zero count after 90 degree phase angle has been counted, but continues to count. This inherent feature of the counter will remove the 90 degree term from the phase angle counted and result in the counter value, then read by the microcomputer at a current zero-crossing, being an exact representation of the required motor phase angle.

Microcomputer 34 is preferably an INTEL 8748 as this device is self contained, having on board EPROM which reduces the size, cost and complexity of the computer system. This calculation method provides a reliable, repeatable and simple means of keeping the motor correctly fluxed, without the undesirable problems that would be created if an external tachometer had to be fitted to the motor.

The efficiency of the system can be further optimised by a variable fluxing scheme which fluxes the driven motor according to its load. As the motor loading changes the inverter adjusts the fluxing of the motor to optimise efficiency. This results from the discovery that fluxing at the motor design value does not produce optimum performance. This has the incidental advantage of significantly reducing audible noise levels of the drive.

It has been discovered that the motor flux should be varied in relation to the phase angle $\phi$ and hence optimised according to the given loading condition.

The relation between phase current and magnetising current is better rewritten as $$I = \frac{I_q}{\sin\phi} \times f(\phi)$$

where $f(\phi)$ is some function of the phase angle $\phi$ that decreases from unity to a minimum practical value as $\phi$ increases from 0° toward 90° (lagging). This effectively reduces Iq when the motor is running at less than full load torque.

Figure 9:
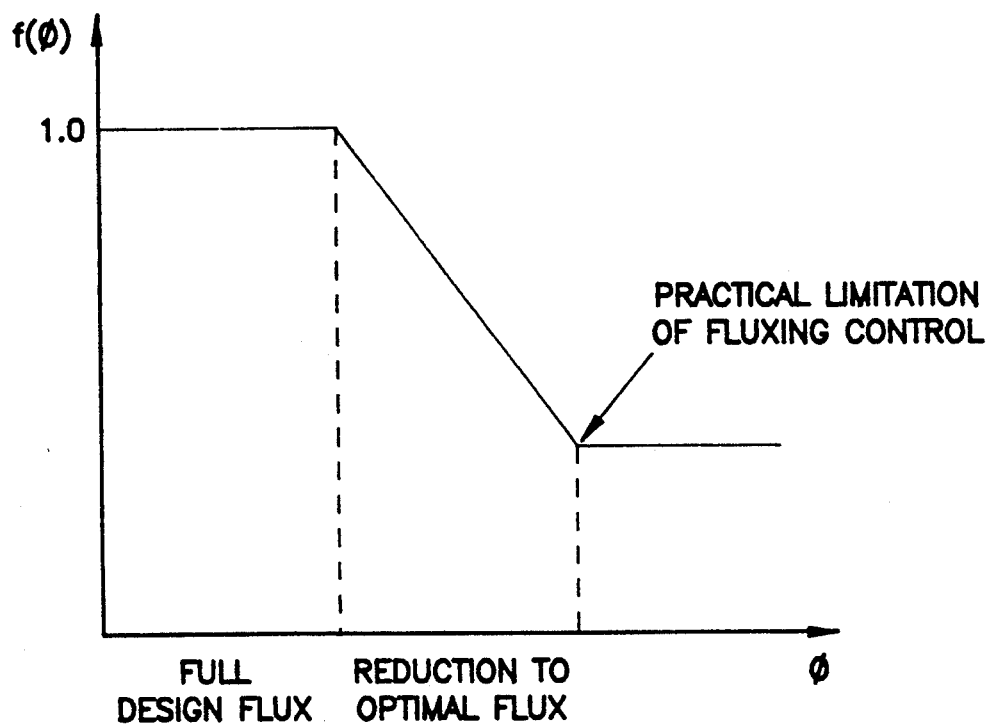
FIG. 9 is a graph of $f(\phi)$ v.$\phi$ for optimum motor fluxing

This may be more clearly understood with reference to FIG. 9 which shows the desired relationship between $f(\phi)$ and $\phi$. This curve has been empirically derive.

As motor loading varies then so does motor power factor and hence phase signal, e.g. A fully loaded 4-pole 3 KW motor will have a design power factor of 0.83 say (34 degrees phase angle) and a power factor of 0.58 (55 degrees phase angle) at 10% loading.

If at a 10% loading condition full design flux is supplied to the motor it will be running at above the optimal fluxing level and hence not at maximum efficiency. Alternatively if the fluxing is reduced to such a level as to maximise motor efficiency for a given load condition then the motor can be said to be operating under optimal conditions.

The above equation for phase current can therefore replace the simpler equation in the software for the on-board microcomputer 34 for the calculation of motor current, I.

Tests have shown that up to 50% gains in motor efficiency are possible at low speeds (0.1 p.u.) and low loadings (0.1 p.u.) These gains tapered off as expected at higher speeds (0.8 p.u.) and at higher loadings (0.6 p.u.) to 3%.

One of the criteria used for selecting the optimal value of $f(\phi)$, for a particular loading condition, is that the motor slip should not be increased significantly. If the motor slip was to increase this would change the motor impedance and hence the measured value of $\phi$.

What is claimed is:

1. An AC motor speed controller comprising: a polyphase switching inverter the output phases of which supply power to the controlled motor and the switching of which is determined by a polyphase input signal, a polyphase sinewave generator of variable frequency and amplitude which supplies phase reference waveforms for the inverter, said frequency determining the speed of the controlled motor, and in respect of each phase: a low value resistor in series with the inverter output and motor across which a voltage waveform linearly proportional to the current waveform is developed; isolating means having an input port and an output port with the input port being connected to said generator to receive a reference waveform, the outlet port having first and second terminals; comparator means having one input connected to the first terminal of the output port of said isolating means and a second input connected to the motor side of said resistor; the second terminal of the output port of the isolating means being connected to the inverter side of said resistor which provides a common reference potential for the comparator inputs; and said comparator output forming one phase of said inverter polyphase input signal.

2. A motor speed controller according to claim 1 wherein the isolating means is a voltage transformer.

3. An AC motor speed controller comprising: a polyphase switching inverter the output phases of which supply power to the controlled motor and the switching of which is determined by a polyphase input signal, a polyphase sinewave generator of variable frequency and amplitude which supplies phase reference waveforms for the inverter, said frequency determining the speed of the controlled motor, and said frequency and amplitude determined by respective control signals, inverter output phase current sensing means which generate waveforms substantially linearly proportional to the phase current waveforms.

comparator means which compare the waveforms from the current sensing means with said reference waveforms and supply error signals as the inverter polyphase input signal to provide current feedback, means which sense the inverter output phase current and voltage and derive the phase difference between them, a microcomputer, loaded with the value of the magnetising current appropriate to the controlled motor and a function of the phase difference and continually on-line loaded with a digital value representing said phase difference, which continually calculates a quotient equal to the magnetising current divided by the sine of the phase difference, the product of said quotient and the function of the phase angle, and outputs said product as the control signal for the sinewave generator amplitude.

4. A motor speed controller according to claim 3, wherein the means which sense the inverter output phase current and voltage comprise:

waveform sensors which output the phase current and voltage waveforms;

low pass filter means which filter the sensor output waveforms; and zero-crossing-detection means which zero-detect each filtered sensor output and produce current and voltage zero-crossing pulse waveforms.

5. A motor speed controller according to claim 4, wherein the means which derive the phase difference between the inverter output phase current and voltage comprise counter means which detect intervals between consecutive zero-crossing pulses, and during said intervals count pulses having a frequency proportional to the inverter output frequency.

6. A motor speed controller according to claim 3, wherein the function of the phase difference has a magnitude less than unity for phase differences approaching 90°.

* * * * *